United States Patent [19]
Adams

[11] Patent Number: 5,375,820
[45] Date of Patent: Dec. 27, 1994

[54] DROP-IN UNIT, GRID INSERT THEREFOR AND METHOD OF MAKING SAME

[75] Inventor: Steven J. Adams, New Market, Tenn.

[73] Assignee: Steadley Company, Carthage, Mo.

[21] Appl. No.: 64,591

[22] Filed: May 19, 1993

[51] Int. Cl.⁵ .............................................. F16F 3/00
[52] U.S. Cl. ...................... 267/103; 267/101; 5/267
[58] Field of Search ............ 267/91, 95, 101, 103, 267/104, 106, 112; 5/254, 257, 267, 270, 275–277, 248, 475, 478

[56] References Cited

U.S. PATENT DOCUMENTS

| | | | |
|---|---|---|---|
| 4,055,337 | 10/1977 | Laiche | 267/101 |
| 4,480,823 | 11/1984 | Marcinczyk | 267/91 |
| 4,867,423 | 9/1989 | Marsh | 267/91 |
| 5,184,802 | 2/1993 | Galumbeck | 267/103 |

FOREIGN PATENT DOCUMENTS 776984 6/1957 United Kingdom ............... 267/101

Primary Examiner—Robert J. Oberleitner
Assistant Examiner—Clifford T. Bartz
Attorney, Agent, or Firm—Lee, Mann, Smith, McWilliams, Sweeney & Ohlson

[57] ABSTRACT

A drop-in spring assembly unit and method of manufacture of furniture. The assembly unit includes a plurality of spring elements coupled together by unique individual grid inserts, a wire base that may be customized to customer specifications and a border wire surrounding the top perimeter of the unit. The grid inserts are assembled prior to assembly of the drop-in unit and are coupled to spring elements by cushion clips.

11 Claims, 3 Drawing Sheets

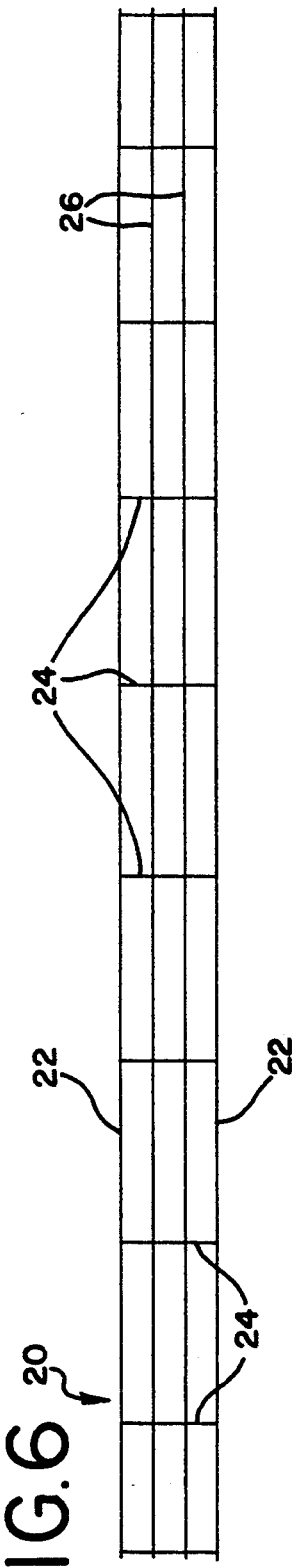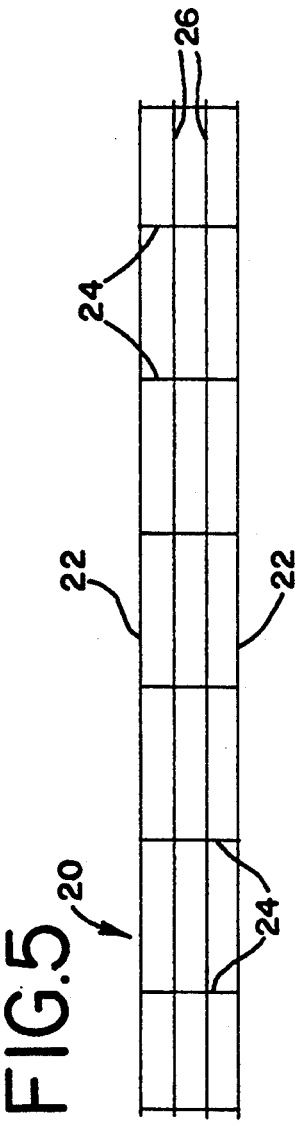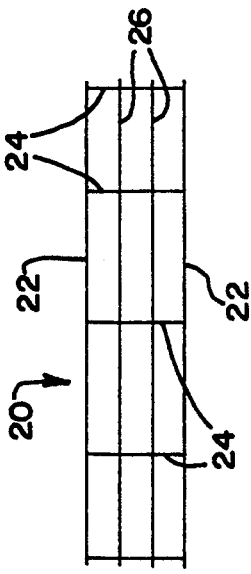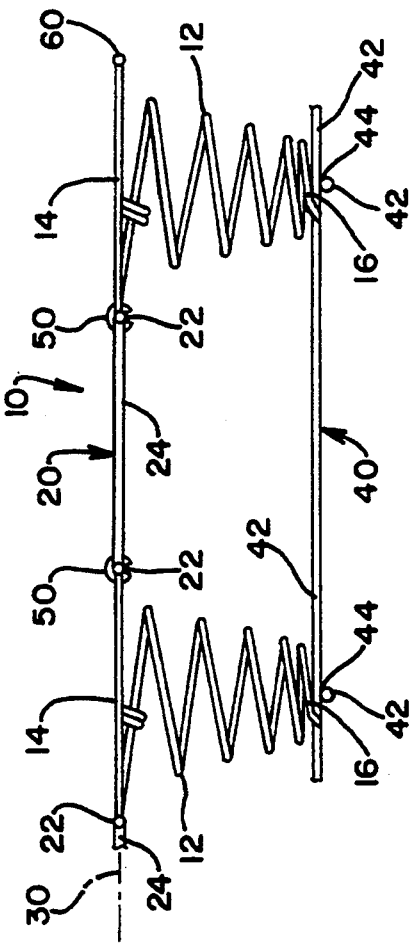

DROP-IN UNIT, GRID INSERT THEREFOR AND METHOD OF MAKING SAME

BACKGROUND OF THE INVENTION

This invention is generally directed to foundational units used in the construction of furniture and is specifically directed to a drop-in spring assembly unit utilizing grid inserts to interlock spring elements.

Spring assemblies used in the manufacture of furniture are often made of a plurality of springs arranged in rows or columns and jointly attached to a grid structure which overlaps the springs. U.S. Pat. No. 4,426,070 demonstrates such as assembly. In this particular device, the spring assembly comprises a base frame, a grid frame and coil springs connected at the base and within the grid frame. Here, the grid frame is a single structure extending over the spring elements. The grid structure is specifically designed to hold the spring elements in place without an external coupling means. Regardless, the manufacture of the grid structure is work intensive requiring the welding of many intersections. In addition, the construction of the unit is further complicated by the need to identify and fit each spring element to its proper location on the grid structure of the assembly unit.

Other conventional methods of assembly for units having grid structures include cross helical hook up, hook and lace wire hook up and hand tie. However, none of the prior art methods offer a grid structure which will not overlay the springs, nor do any of the methods provide a cushion clip means for connecting rows of spring elements that simplifies the construction of the unit and maximizes the resiliency of the springs.

In a typical assembly unit, the grid structure is composed of a one piece grid comprising a series of interlaced wires which are welded at their intersections and joined to the spring elements and a border wire by welding or wrapping. The one piece grid is typically designed to prevent longitudinal sagging. However, because it is one piece, it does not allow coils to interact with each other to maximize spring resiliency and offer a firmer, stronger unit. The resiliency of assembly units is provided by the springs which in the prior art units are oriented either beneath the intersections of the grid wires or between adjacent grid wires, depleting their full effectiveness.

There exists a need, therefore, for a simplified drop-in spring assembly unit that results in a stronger foundation at the same or less cost.

SUMMARY OF THE INVENTION

The present invention is a drop-in spring assembly unit typically used for seating in items of furniture such as chairs, sofas and love seats, and the like. The subject invention is illustrated in a preferred embodiment of three forms. A method of manufacture is also provided.

The drop-in spring assembly unit is generally rectangular in shape and comprises a plurality of grid inserts which are used to interlock rows of spring elements together. The invention also contains a wire base tailored to each specific furniture design configuration and a border wire surrounding the perimeter of the unit and location in a top plane parallel to the wire base. The border wire is tangentially attached to the tops of the spring elements positioned along the periphery of the unit.

In accordance with the preferred embodiment, a grid insert connects adjacent parallel rows of springs. The grid inserts do not overlie the springs, but rather span the spaces between the rows of springs while interlocking the elements together. Springs are therefore coupled together without having an overall welded unitary top grid structure and without a grid insert overlapping the springs. In the preferred embodiment, both the grid inserts and the border wire are fastened to the springs tangentially by cushion clips. However, alternatively a spring element can be attached to either the border wire or the grid insert by helical winding, by ties, by welding or by button fasteners as described in U.S. Pat. No. 4,003,563.

The grid inserts of the subject invention incorporate a pair of longitudinally extending parallel wires and a plurality of laterally extending parallel wires perpendicularly traverse to the longitudinal wires. All the wires are secured together at right angles. Although it is preferable to weld the grid wires together when fabricating the insert, the wires could be attached by other conventional means, as well. In addition, the grid insert may include a plurality of intermediate longitudinal wires positioned in parallel between the longitudinally extending wires. The intermediate wires are also fixed to the laterally extending parallel wires by welding or other fastening means. Upon assembly, the grid is positioned within the top plane of the spring assembly unit.

In the preferred embodiment, the spring elements are coil springs formed of spring wire. The springs may be of an hourglass, cylindrical or conical shape. Other types of spring elements available include torsion springs formed from a band of U-shaped spring wire members joined at inner ends by one or more loops, or a combination of coil and torsion springs.

The assembly unit further comprises a plurality of base wires defining the wire base. The wire base is substantially planar and parallel to the top plane containing the tops of the spring elements, the border wire and the grid inserts. The base wires are positioned and intersect at right angles to one another to form the wire base. The bottoms of the spring elements are then mounted at the intersections where the wires meet.

BRIEF DESCRIPTION OF THE DRAWINGS

The invention is described in greater detail in the following description of examples embodying the best mode of the invention, taken in conjunction with the drawing figures, in which:

FIG. 4 is a top plan view of one form of a grid insert for a chair.

FIG. 7 is an enlarged elevational cross sectional view of a portion of a drop-in assembly.

DESCRIPTION OF EXAMPLES EMBODYING THE BEST MODE OF THE INVENTION

Figure 1:
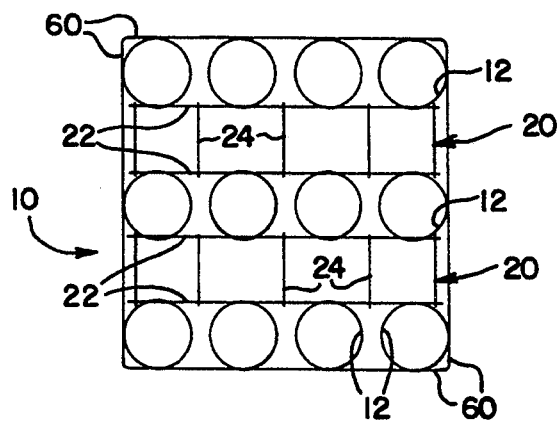
FIG. 1 is a top plan view of a drop-in assembly for a chair.
Figure 2:
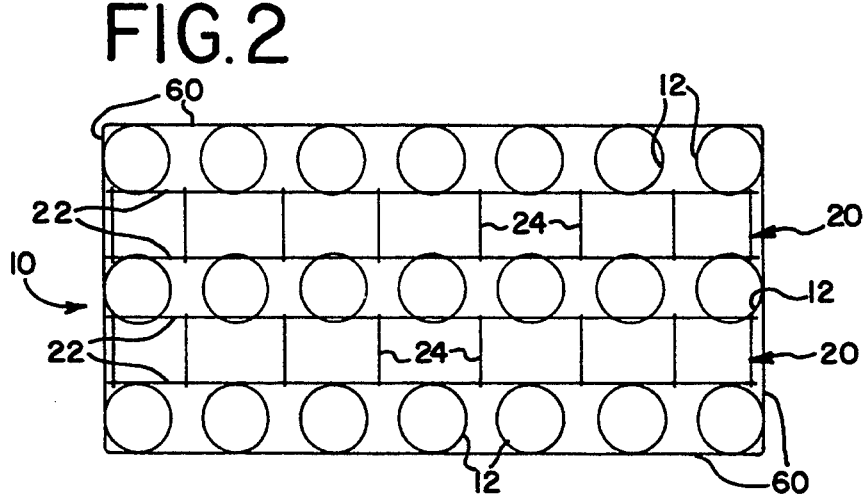
FIG. 2 is a top plan view of a drop-in assembly for a love seat.
Figure 3:
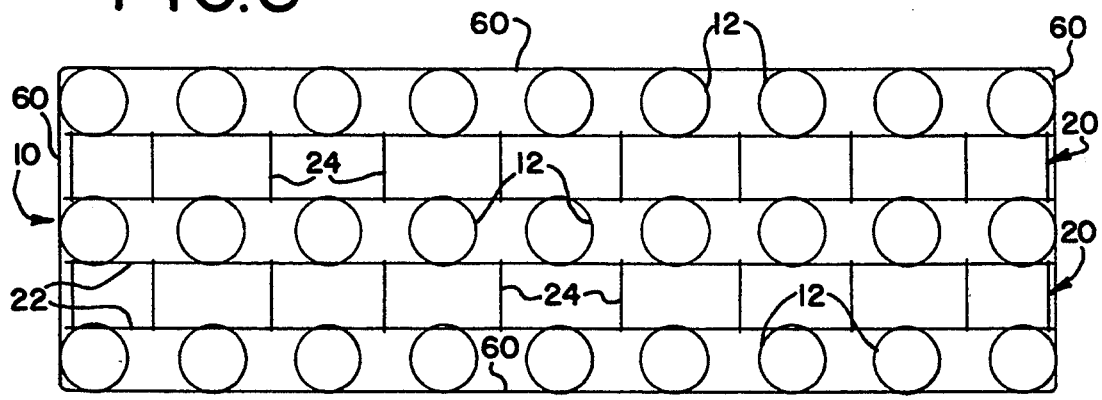
FIG. 3 is a top plan view of a drop-in assembly for a sofa.
Figure 6:
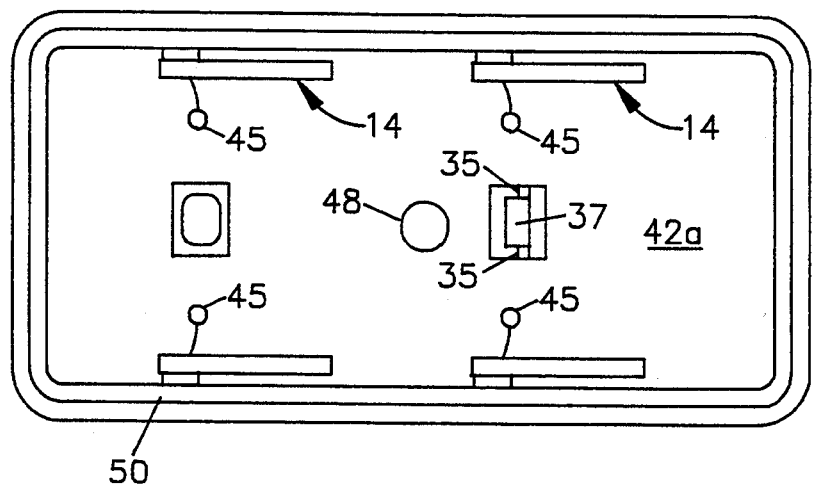
FIG. 6 is a top plan view of one form of a grid insert for a sofa.
Figure 5:
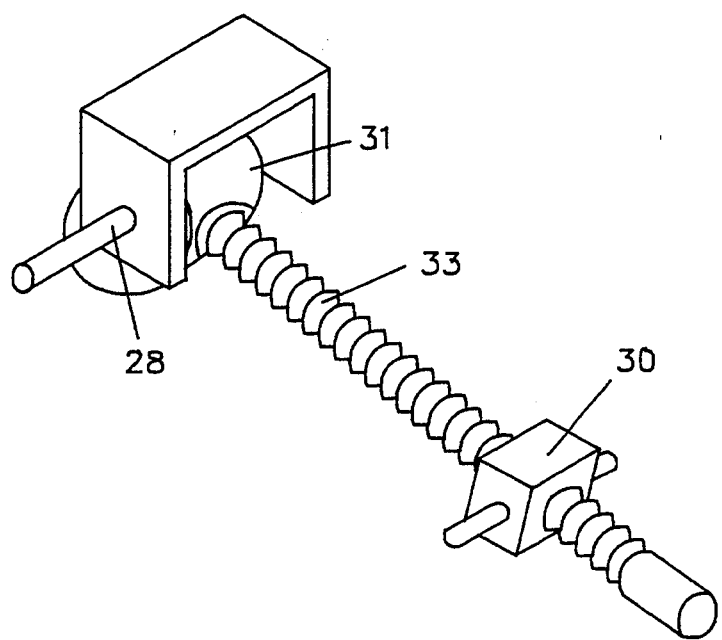
FIG. 5 is a top plan view of one form of a grid insert for a love seat.

A drop-in spring assembly unit for use in furniture according to the present invention is generally designated at 10 in the drawing figures. It is installed in furniture such as chairs, love seats and sofas. The top views of FIGS. 1-3 show units 10 sized for chairs, love seats and sofas, respectively. Each drop-in spring assembly unit 10 consists of a plurality of parallel rows of spring elements 12 preferably in the form of spring coils (only the top convolutes of which are shown in FIGS. 1-3) which are interlocked by a plurality of grid inserts 20 positioned between the rows and tangentially attached to the tops of the spring element 12.

Each spring element 12 has a top 14 and a bottom 16. The top of each spring element lies in a top plane 30 and the bottom of each spring element lies within a substantially planar wire base 40. The spring elements 12 are longitudinally positioned in a spaced relationship to form a plurality of adjacent parallel rows.

The grid inserts 20 connect the rows of spring elements 12 together and are positioned in the top plane 30 of the spring assembly 10. Each grid insert 20 is located between two rows of spring elements and is tangentially attached to the tops of the spring element 12 by a coupling means. In the preferred embodiment, the coupling means comprises a cushion clip 50. However, it is possible to attach the spring elements 12 to the grid inserts 20 by welding, tieing or other mechanisms such as a button type of device.

Each grid insert 20 comprises a pair of outer longitudinally extending parallel wires 22 and a plurality of laterally extending parallel wires 24 attached to the outer wires 22 at right angles. In the preferred embodiment, the wires 22 and 24 are coupled together by welding. As shown in FIGS. 3 to 6, the grid inserts 20 may also contain intermediate wires 26 positioned in parallel between the longitudinally extending wires pair 22 and welded to the wires 24 in order to add additional strength and rigidity.

The wire base 40 consists of a plurality of bottom wires 42 positioned at right angles forming a series of wire intersections 44. Each spring element 12 is secured to the wire base 40 by attaching the bottom 16 of the spring element 12 to a wire intersection 44. The spring element 12 can be simply wound around the wire intersection 44 in a conventional fashion in order to secure it to the wire base 40. The wire base may also be fitted to a specific furniture design to drop readily therein.

A border wire 60 surrounds the perimeter of drop-in spring assembly unit 10 outlining the extent of the top plane 30. The grid inserts 20 and the tops 14 of the spring elements 12 are positioned within the top plane 30. The border wire 60 is tangentially coupled to the tops of each spring element located in the rows along the periphery of the unit, preferably by the cushion clips 50. Other means of attaching the border wire 60 to the spring element 12 may include welding, and tieing or a wire pigtail.

To construct the drop-in spring assembly unit 10 of the invention, the grid inserts 20 are prefabricated and welded together. The border wire 60 is separately constructed and formed to fit the perimeter requirements of the unit 10. The wire base 40 is then assembled by arranging the necessary wires 42 in order to provide the correct number of spaced wire intersections 44 corresponding to the number of spring elements 12 utilized. The spring elements 12 are then attached to the wire base 40, the grid inserts 20 and the border wire 60 to form the drop-in spring assembly unit.

ACHIEVEMENTS

The present invention provides both a novel drop-in spring assembly unit and a method of manufacture of the assembly unit. Both the unit and the method utilize the pre-welded grid insert attached to each individual spring element, preferably by the means of a cushion clip. By clipping the grid insert to each of the opposite sides of a spring element or coil, all the springs interact with each other creating a unit which reacts to itself. Unlike the prior art structures, the grid insert of the subject invention forms a solid deck because all of the attachment wires are pre-welded. In addition, heavier wiring may be utilized such as 8 or 12 gauge LC wire versus 11½, 14 or 16½ gauge wire used in the other structures. As a result, a firmer, stronger unit is produced.

Moreover, other structures require individual pieces to be used which creates a potential noise problem. By using pre-welded grid inserts and cushion clips, the noise problem is essentially eliminated in the present invention.

From a production standpoint, the drop-in assembly unit of the present invention is quicker and easier to assembly than other existing methods. Furthermore, a stronger unit is provided at an equal or lesser cost than the units assembled by the conventional methods.

It will be evident that various changes be made to the invention without departing from the spirit thereof or scope of the following claims.

What is claimed is:

1. A drop-in spring assembly unit generally rectangular in shape for constructing furniture, and comprising:
   a. a plurality of spring elements arranged in a spaced relationship to form a plurality of spaced, parallel spring rows, each row being next to at least one other row, each said spring element having a top and bottom, the top of each spring element lying in a top plane, the bottom of each spring element being connected to a substantially planar wire base, said top plane and said wire base being substantially parallel to each other;
   b. at least one grid insert for connecting said spring rows together, each said insert being positioned between two spring rows next to each other;
   c. coupling means tangentially attaching said spring elements of said spring rows next to each other to a said grid insert;
   d. said wire base comprising a plurality of bottom wires, said bottom wires being positioned at right angles to form wire intersections, the bottom of each spring element being connected to a wire intersection;
   e. a border wire surrounding said assembly unit, said border wire being located in said top plane; and
   f. coupling means attaching said border wire to said spring elements.

2. The spring assembly unit of claim 1 wherein said grid insert is planar.

3. The spring assembly unit of claim 2 wherein said grid insert comprises a pair of spaced, longitudinally extending parallel wires and a plurality of laterally extending parallel wires each of which is perpendicularly traverse to and extends between said longitudinally extending parallel wires, each said laterally extending parallel wire being fixed to each said longitudinally extending parallel wire.

4. The spring assembly unit of claim 3 wherein said grid insert further includes at least one intermediate longitudinal wire positioned in parallel between and spaced from said first pair of longitudinally extending wires, said intermediate longitudinal wires being fixed to said laterally extending parallel wires.

5. The spring assembly unit of claim 3 wherein said laterally extending wires are equally spaced apart.

6. The spring assembly unit of claim 1 wherein said coupling means comprises a cushion clip.

7. The spring assembly unit of claim 1 wherein said spring element is a coil of conical shape.

8. A method of assembling a drop-in spring assembly unit generally rectangular in shape, said unit being for furniture construction and having a plurality of spring elements having tops and bottoms, said spring elements being arranged in a spaced relationship forming a plurality of spaced, parallel spring rows, each row being next to at least one other row, at least one grid insert for connecting said spring elements together, each said grid insert being positioned between two spring rows next to each other and being tangentially attached by coupling means to the tops of said spring elements, a plurality of bottom wires for mounting said spring elements in a base plane, and a border wire for connecting said spring elements along a perimeter of a top plane of said unit, the method comprising the steps of:

a. forming each said grid insert, said grid insert comprising a pair of longitudinally extending parallel wires and a plurality of laterally extending parallel wires which are perpendicularly traverse and are fixed to said longitudinally extending parallel wires;

b. forming a perimeter border wire;

c. forming a wire base having a plurality of bottom wires positioned at right angles to form wire intersections, said bottom wires being fixed at said intersections;

d. attaching said spring elements to said wire base with the bottom of each spring element being mounted at a said wire intersection;

e. coupling each said grid insert to each spring element of spring rows next to each other; and f. coupling said perimeter border wire to spring elements located along said perimeter.

9. The method according to claim 8 wherein a cushion clip couples said spring elements to said grid inserts and said border wire.

10. The method according to claim 8 wherein said laterally extending parallel wires of said grid inserts are welded to said longitudinally extending parallel wires.

11. The method according to claim 8 wherein in step "a" at least one additional intermediate longitudinal wire is positioned between and spaced from said longitudinally extending wires.

* * * * *

UNITED STATES PATENT AND TRADEMARK OFFICE
CERTIFICATE OF CORRECTION

PATENT NO. : 5,375,820
DATED : December 27, 1994
INVENTOR(S) : Steven J. Adams

It is certified that error appears in the above-indentified patent and that said Letters Patent is hereby corrected as shown below:

The title page should read —11 claims, 2 Drawing Sheets—.

Signed and Sealed this

Eleventh Day of April, 1995

Attest:

BRUCE LEHMAN

Attesting Officer     Commissioner of Patents and Trademarks